(12) United States Patent
Li et al.

(10) Patent No.: US 12,135,856 B2
(45) Date of Patent: Nov. 5, 2024

(54) TOUCH ELECTRODE STRUCTURE AND DISPLAY DEVICE

(71) Applicant: BOE TECHNOLOGY GROUP CO., LTD., Beijing (CN)

(72) Inventors: Yuanyuan Li, Beijing (CN); Meizhu Zheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/914,487

(22) PCT Filed: Sep. 10, 2021

(86) PCT No.: PCT/CN2021/117745
§ 371 (c)(1),
(2) Date: Sep. 26, 2022

(87) PCT Pub. No.: WO2022/078136
PCT Pub. Date: Apr. 21, 2022

(65) Prior Publication Data
US 2023/0109974 A1     Apr. 13, 2023

(30) Foreign Application Priority Data

Oct. 12, 2020   (CN) .......................... 202011085458.3

(51) Int. Cl.
*G06F 3/044*   (2006.01)
*G02F 1/1333*  (2006.01)
*G06F 3/041*   (2006.01)

(52) U.S. Cl.
CPC ........ *G06F 3/0446* (2019.05); *G02F 1/13338* (2013.01); *G06F 3/0412* (2013.01); *G06F 3/0445* (2019.05); *G06F 2203/04111* (2013.01)

(58) Field of Classification Search
CPC .... G06F 3/0446; G06F 3/0445; G06F 3/0412; G06F 2203/04111; G02F 1/13338
See application file for complete search history.

(56) References Cited

U.S. PATENT DOCUMENTS 10,693,090 B2   6/2020   Zhai et al.
11,314,360 B2   4/2022   Liu et al.
(Continued)

FOREIGN PATENT DOCUMENTS

CN      109002205 A    12/2018
CN      109037469 A    12/2018
(Continued)

*Primary Examiner* — Ariel A Balaoing
(74) *Attorney, Agent, or Firm* — Raj S. Dave; Dave Law Group LLC

(57) ABSTRACT

A touch electrode structure and a display device. The touch electrode structure includes a plurality of first touch electrodes and a plurality of second touch electrodes; each first touch electrode extends along a second direction; each second touch electrode extends along the first direction. Each first touch electrode includes a plurality of first touch electrode blocks and bridge structures; the plurality of first touch electrode blocks are arranged along the second direction; the bridge structures are located between every two adjacent first touch electrode blocks; each first touch electrode block includes a plurality of first openings; each first opening includes a first body portion and first extension portions located at two ends of the first body portion; each first body portion extends approximately along the second direction; each first extension portion extends approximately along the first direction.

18 Claims, 6 Drawing Sheets

(56) References Cited

U.S. PATENT DOCUMENTS

| | | | |
|---|---|---|---|
| 2010/0097344 A1* | 4/2010 | Verweg | G06F 3/0446 |
| | | | 345/174 |
| 2015/0324027 A1 | 11/2015 | Heo et al. | |
| 2017/0330917 A1 | 11/2017 | Kim et al. | |
| 2018/0223298 A1* | 8/2018 | Heo | G06F 3/041 |
| 2019/0220113 A1* | 7/2019 | Zheng | G06F 3/044 |
| 2020/0333918 A1 | 10/2020 | Lin et al. | |
| 2021/0373713 A1* | 12/2021 | Kwon | G06F 3/0448 |
| 2022/0005908 A1 | 1/2022 | Toyomura et al. | |
| 2022/0164044 A1 | 5/2022 | Fang et al. | |
| 2022/0291781 A1* | 9/2022 | Wang | G06F 3/0446 |

FOREIGN PATENT DOCUMENTS

| | | |
|---|---|---|
| CN | 109508118 A | 3/2019 |
| CN | 109616017 A | 4/2019 |
| CN | 110570757 A | 12/2019 |
| CN | 110570759 A | 12/2019 |
| CN | 112462962 A | 3/2021 |

* cited by examiner

100

TOUCH ELECTRODE STRUCTURE AND DISPLAY DEVICE

CROSS-REFERENCE TO RELATED APPLICATIONS

The application is the U.S. National Stage Entry of PCT/CN2021/117745 filed on Sep. 10, 2021, which claims priority to the Chinese patent application No. 202011085458.3 filed on Oct. 12, 2020, the entire disclosures of which are incorporated herein by reference as part of the present application.

TECHNICAL FIELD

Embodiments of the present disclosure relate to a touch electrode structure and display device.

BACKGROUND

With the continuous development of display technology, foldable display devices have become the research focus of major manufacturers. The foldable display device can be folded by a bending axis, so that it can be folded for convenience in carrying, and opened in use to provide a larger display area. Therefore, the foldable display device can provide a better user experience. On the other hand, the touch function is one of the indispensable functions of many display devices. Therefore, the touch electrode structure can be integrated on the foldable display device to realize the touch function.

SUMMARY

Embodiments of the present disclosure provide a touch electrode structure and a display device. The touch electrode structure includes a plurality of first touch electrodes and a plurality of second touch electrodes; the plurality of first touch electrodes are arranged along a first direction, and each first touch electrode extends along a second direction; a plurality of second touch electrodes are arranged along the second direction, and each second touch electrode extends along the first direction. Each first touch electrode includes a plurality of first touch electrode blocks and a bridge structure, the first touch electrode blocks are arranged along the second direction, the bridge structure is located between two adjacent first touch electrode blocks, each first touch electrode block includes a plurality of first openings, each first opening includes a first body portion and first extending portions located at two ends of the first body portion, the first body portion extends approximately along the second direction, and the first extending portions extend approximately along the first direction. Because the two ends of the first body portion are provided with the first extending portions extending along the first direction, in a case the touch electrode structure is bent by taking an bending axis parallel to the second direction as an axis, the first extending portions can effectively prevent the generation of micro cracks, avoid the problems such as the fracture of the bridge structure caused by micro cracks, and improve the bending reliability of the touch electrode structure.

At least one embodiment of the present disclosure provides a touch electrode structure, which includes: a plurality of first touch electrodes, arranged along a first direction, and each of the plurality of first touch electrodes extending along a second direction; and a plurality of second touch electrodes, arranged along the second direction, each of the plurality of second touch electrodes extending along the first direction, each of the first touch electrodes includes a plurality of first touch electrode blocks and a bridge structure, the plurality of first touch electrode blocks are arranged along the second direction, and the bridge structure is located between two adjacent ones of the plurality of first touch electrode blocks, each of the plurality of first touch electrode blocks includes a plurality of first openings, each of the plurality of first openings includes a first body portion and first extending portions located at two ends of the first body portion, the first body portion extends approximately along the second direction and the first extending portions extends approximately along the first direction.

For example, in the touch electrode structure provided by an embodiment of the present disclosure, the touch electrode structure is configured to be bent by taking a bending axis parallel to the second direction as an axis.

For example, in the touch electrode structure provided by an embodiment of the present disclosure, an edge of each of the plurality of first touch electrode blocks is a smooth edge.

For example, in the touch electrode structure provided by an embodiment of the present disclosure, a shape of an orthographic projection of each of the plurality of first openings on a plane where the plurality of first touch electrodes are located includes an I-shape.

For example, in the touch electrode structure provided by an embodiment of the present disclosure, the first body portion includes a bending direction, and bending directions of first body portions of two adjacent ones of the plurality of first openings in the second direction are opposite.

For example, in the touch electrode structure provided by an embodiment of the present disclosure, two adjacent ones of the plurality of first openings in the second direction are staggered in the first direction. For example, in the touch electrode structure provided by an embodiment of the present disclosure, each of the plurality of first touch electrode blocks includes a bridge portion, and the bridge structure is connected with two bridge portions of two adjacent ones of the plurality of first touch electrode blocks in the second direction, respectively, an included angle between a tangent of each point on an outer edge of the bridge portion and the second direction is greater than 60 degrees.

For example, in the touch electrode structure provided by an embodiment of the present disclosure, the included angle between the tangent of each point on the outer edge of the bridge portion and the second direction is greater than 75 degrees.

For example, in the touch electrode structure provided by an embodiment of the present disclosure, the included angle between the tangent of each point on the outer edge of the bridge portion and the second direction continuously changes.

For example, the touch electrode structure provided by an embodiment of the present disclosure further includes: an insulating layer, located on the plurality of first touch electrode blocks and the plurality of second touch electrodes, the bridge structure includes a conductive structure and a via hole located in the insulating layer, the conductive structure is located on a side of the insulating layer away from the plurality of first touch electrode blocks, and the bridge structure is respectively connected with two bridge portions of two adjacent ones of the plurality of first touch electrode blocks in the second direction through the via hole.

For example, in the touch electrode structure provided by an embodiment of the present disclosure, each of the plurality of first touch electrode blocks further includes a plurality of second openings, and each of the plurality of second openings extends approximately along the first direction.

For example, in the touch electrode structure provided by an embodiment of the present disclosure, each of the plurality of second openings includes a bending direction, and bending directions of two adjacent ones of the plurality of second openings in the first direction are opposite.

For example, in the touch electrode structure provided by an embodiment of the present disclosure, the plurality of second openings are arranged along the second direction to form a plurality of second opening rows, and two adjacent ones of the plurality of second opening rows in the second direction are provided with two first openings of the plurality of first openings which are arranged in sequence along the second direction.

For example, in the touch electrode structure provided by an embodiment of the present disclosure, an orthographic projection of each of the plurality of first openings on one of the plurality of second opening rows is at least partially located between two adjacent ones of the plurality of second openings.

For example, in the touch electrode structure provided by an embodiment of the present disclosure, an included angle between a connection line connecting an end of one of the plurality of first openings close to one of the plurality of second openings and an end of the one of the plurality of second openings close to the one of the plurality of first openings and the first direction is not equal to 90 degrees.

For example, in the touch electrode structure provided by an embodiment of the present disclosure, each of the plurality of second touch electrodes includes a plurality of second touch electrode blocks and a plurality of connection portions, the plurality of second touch electrode blocks are arranged along the first direction, each of the connection portions is located between two adjacent ones of the plurality of second touch electrode blocks, and the plurality of second touch electrode blocks are integrally formed with the plurality of connection portions.

For example, in the touch electrode structure provided by an embodiment of the present disclosure, the plurality of first touch electrode blocks and the plurality of second touch electrode blocks are arranged in a same layer and insulated, and each of the plurality of second touch electrode blocks includes a plurality of third openings, and each of the plurality of third openings includes a second body portion and second extending portions located at two ends of the second body portion, the second body portion extends approximately along the second direction and the second extending portions extend approximately along the first direction.

For example, the touch electrode structure provided by an embodiment of the present disclosure further includes: a first dummy electrode, arranged in a same layer as the plurality of first touch electrode blocks and insulated from the plurality of first touch electrode blocks, the first dummy electrode is located in a middle of each of the plurality of first touch electrode blocks, and the each of the plurality of first touch electrode blocks are arranged around the first dummy electrode.

For example, the touch electrode structure provided by an embodiment of the present disclosure further includes: a second dummy electrode, arranged in a same layer as the plurality of second touch electrode blocks and insulated from the plurality of second touch electrode blocks, the second dummy electrode is located in a middle of each of the plurality of second touch electrode blocks, and the each of the plurality of second touch electrode blocks is arranged around the second dummy electrode.

For example, in the touch electrode structure provided by an embodiment of the present disclosure, each of the plurality of first touch electrodes is a touch driving electrode, and each of the plurality of the second touch electrodes is a touch sensing electrode.

For example, in the touch electrode structure provided by an embodiment of the present disclosure, the materials of the first touch electrode and the second touch electrode include a transparent oxide material.

At least one embodiment of the present disclosure further provides a display device, which includes the abovementioned touch electrode structure.

For example, in the display device provided by an embodiment of the present disclosure, the display device includes a bending axis, and an extending direction of the bending axis is parallel to the second direction.

For example, the display device provided by an embodiment of the present disclosure further includes: a display panel; a cover plate; a polarizer; and a first adhesive layer, located between the cover plate and the polarizer, the touch electrode structure is located between the display panel and the cover plate.

For example, the display device provided by an embodiment of the present disclosure further includes: a transparent substrate; and a second adhesive layer, located between the transparent substrate and the display panel, the touch electrode structure is located on the transparent substrate, and the transparent substrate is located on a side of the touch electrode structure away from the polarizer.

For example, the display device provided by an embodiment of the present disclosure further includes: a third adhesive layer, located between the transparent substrate and the touch electrode structure.

For example, the display device provided by an embodiment of the present disclosure further includes: a fourth adhesive layer, located between the touch electrode structure and the display panel, the touch electrode structure is located on the polarizer, and the touch electrode structure is located on a side of the polarizer away from the fourth adhesive layer.

For example, in the display device provided by an embodiment of the present disclosure, the touch electrode structure is located between the cover plate and the first adhesive layer.

For example, in the display device provided by an embodiment of the present disclosure, the display panel includes an encapsulation layer, and the touch electrode structure is located between the encapsulation layer and the polarizer.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

Generally, the touch electrode structure can include a plurality of touch driving electrodes and a plurality of touch sensing electrodes which are arranged in a cross way, so that the touch function can be realized through the change of the sensing capacitance. In order to improve the optical performance and touch performance of the above-mentioned touch electrodes (for example, touch driving electrodes and touch sensing electrodes), an opening can be provided by the touch electrodes, which on the one hand can prevent users from seeing regular thin lines (etched lines 90), thereby improving the optical performance, and on the other hand can also reduce the load of the touch electrodes, thereby improving the touch performance.

Figure 1:
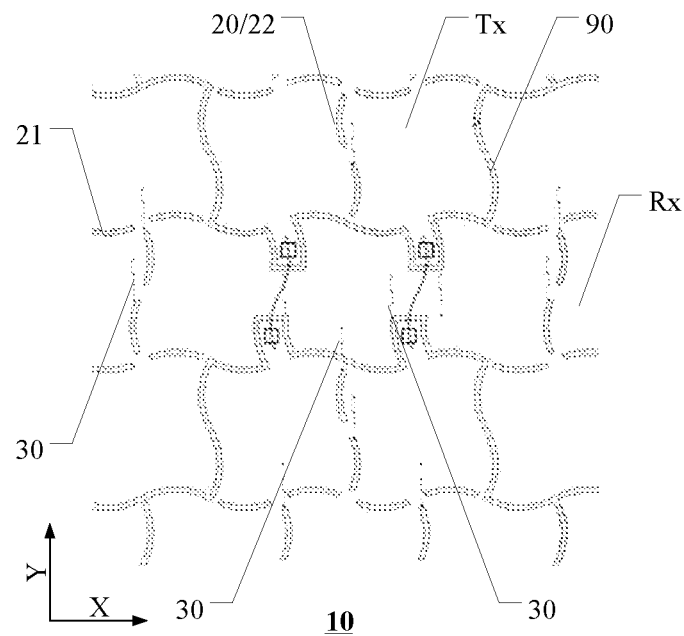
FIG. 1 is a schematic plan view of a touch electrode structure.

However, the inventor(s) of the present application found that the touch electrode provided with the opening is easy to generate micro cracks in the bending process. FIG. 1 is a schematic plan view of a touch electrode structure. As illustrated in FIG. 1, the touch electrode structure 10 includes a plurality of touch driving electrodes Tx and a plurality of touch sensing electrodes Rx. Each touch driving electrode Tx and each touch sensing electrode Rx is provided with two kinds of openings 20, including an opening 21 extending approximately along a first direction and an opening 22 extending approximately along a second direction. As illustrated in FIG. 1, in a case the above-mentioned touch electrode structure 10 is integrated in a foldable display device, and the second direction is parallel to the bending axis of the foldable display device, the opening 22 extending approximately along the second direction is prone to generate micro cracks 30 upon being bended. The micro cracks 30 may cause the bridge structure of the touch driving electrode Tx to break, thus making the touch function of the touch driving electrode structure invalid. On the other hand, as illustrated in FIG. 1, the portion where the touch driving electrode block of each touch driving electrode Tx is connected to the bridge structure adopts a right-angle design, and the edge of this right-angle design is also prone to generate micro cracks 30.

Embodiments of the present disclosure provide a touch electrode structure and a display device. The touch electrode structure includes a plurality of first touch electrodes and a plurality of second touch electrodes; the plurality of first touch electrodes are arranged along a first direction, and each first touch electrode extends along a second direction; a plurality of second touch electrodes are arranged along the second direction, and each second touch electrode extends along the first direction. Each first touch electrode includes a plurality of first touch electrode blocks and a bridge structure, the first touch electrode blocks are arranged along the second direction, the bridge structure is located between two adjacent first touch electrode blocks, each first touch electrode block includes a plurality of first openings, each first opening includes a first body portion and first extending portions located at two ends of the first body portion, the first body portion extends approximately along the second direction, and the first extending portions extend approximately along the first direction. Because the two ends of the first body portion are provided with the first extending portions extending along the first direction, in a case the touch electrode structure is bent by taking an bending axis parallel to the second direction as an axis, the first extending portions can effectively prevent the generation of micro cracks, avoid the problems such as the fracture of the bridge structure caused by micro cracks, and improve the bending reliability of the touch electrode structure.

Hereinafter, the touch electrode structure and the display device provided by the embodiments of the present disclosure will be described in detail with reference to the accompanying drawings.

Figure 2A:
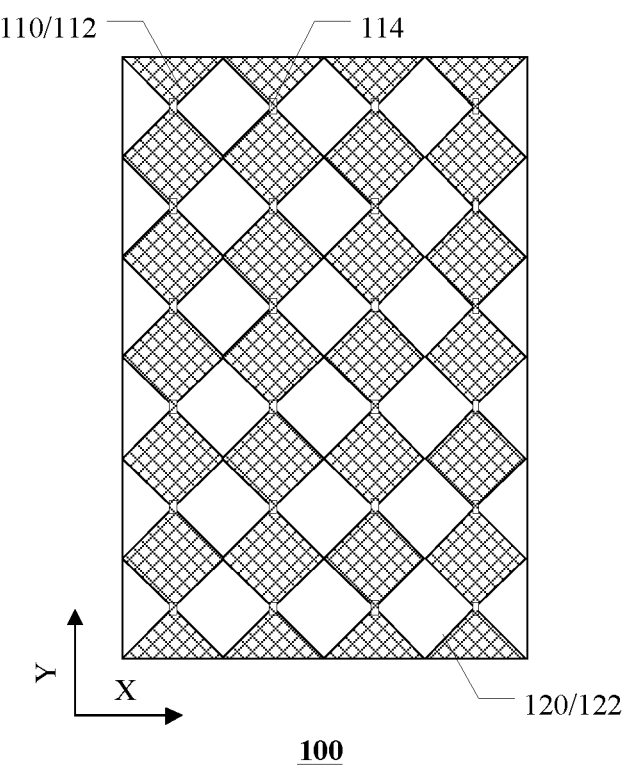
FIG. 2A is a schematic plan view of a touch electrode structure according to an embodiment of the present disclosure.
Figure 2B:
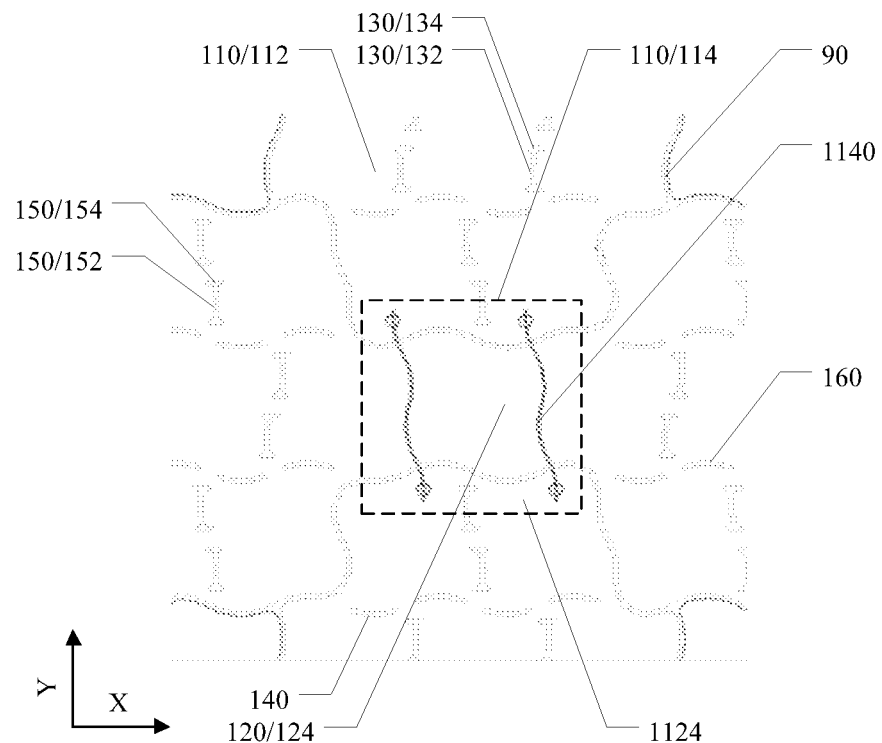
FIG. 2B is a partial plan view of a touch electrode structure according to an embodiment of the present disclosure.
Figure 2C:
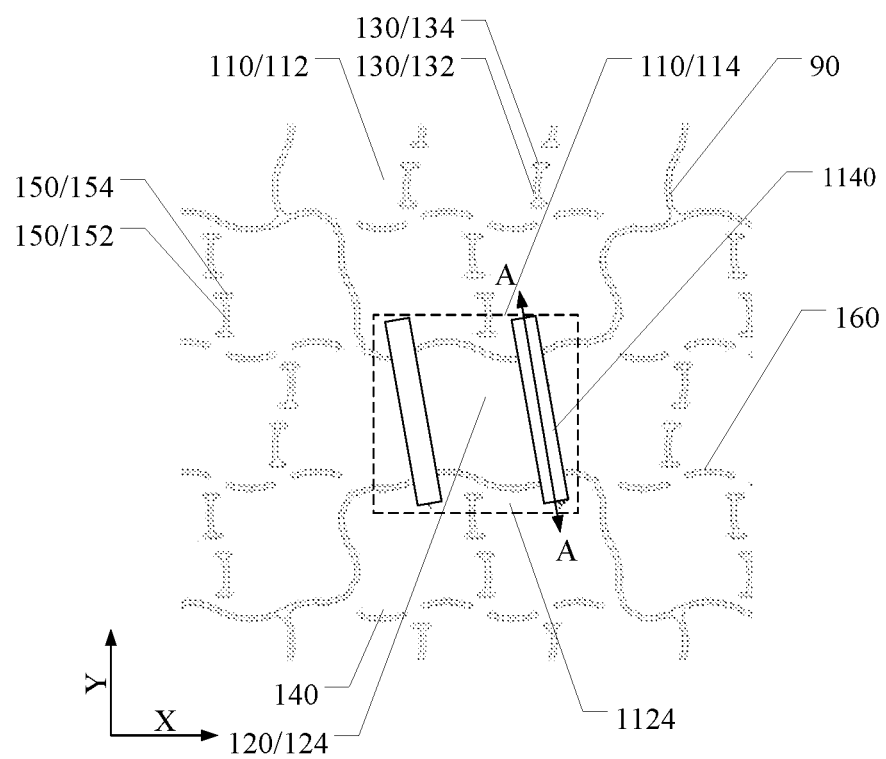
FIG. 2C is a partial plan view of another touch electrode structure according to an embodiment of the present disclosure.

An embodiment of the disclosure provides a touch electrode structure. FIG. 2A is a schematic plan view of a touch electrode structure according to an embodiment of the present disclosure; FIG. 2B is a partial plan view of a touch electrode structure according to an embodiment of the present disclosure; FIG. 2C is a partial plan view of another touch electrode structure according to an embodiment of the present disclosure.

As illustrated in FIG. 2A, the touch electrode structure 100 includes a plurality of first touch electrodes 110 and a plurality of second touch electrodes 120. The plurality of first touch electrodes 110 are arranged along the first direction X, and each first touch electrode 110 extends along the second direction Y, that is to say, each first touch electrode 110 is a strip-shaped electrode extending along the second direction as a whole, and the first touch electrodes 110 are arranged at intervals along the first direction; the plurality of second touch electrodes 120 are arranged along the second direction, and each second touch electrode 120 extends along the first direction, that is to say, each second touch electrode 120 is a strip-shaped electrode extending along the first direction as a whole, and the second touch electrodes 120 are arranged at intervals along the second direction. It should be noted that the first touch electrode can be a touch driving electrode Tx, and the second touch electrode can be a touch sensing electrode Rx. Alternatively, the first touch electrode may be a touch sensing electrode Rx, and the second touch electrode may be a touch driving electrode Tx. In addition, the number of the first touch electrode and the second touch electrode in FIG. 2A is only schematic, and the number of the first touch electrode and the second touch electrode can be set according to the required size and accuracy of the actually used touch electrode structure.

As illustrated in FIG. 2A, FIG. 2B and FIG. 2C, each first touch electrode 110 includes a plurality of first touch electrode blocks 112 and a bridge structure 114. The plurality of first touch electrode blocks 112 are arranged along the second direction, and the bridge structure 114 is located between two adjacent first touch electrode blocks 112 and electrically connects the two first touch electrode blocks 112. That is to say, the first touch electrode blocks 112 are independent of each other, and two adjacent first touch electrode blocks 112 can be electrically connected by the bridge structure 114. Therefore, the plurality of first touch electrode blocks 112 in each first touch electrode 110 are electrically connected. Each first touch electrode block 112 includes a plurality of first openings 130, and each first opening 130 includes a first body portion 132 and first extending portions 134 located at two ends of the first body portion 132. The first body portion 132 extends approximately along the second direction and the first extending portions 134 extend approximately along the first direction. It should be noted that the above-mentioned "approximately extending along the first direction" includes the case of strictly extending along the first direction, and also includes the case where the included angle between the extending direction and the first direction is less than 15 degrees; similarly, the above-mentioned "approximately extending along the second direction" includes the case of strictly extending along the second direction, and also includes the case where the included angle between the extending direction and the second direction is less than 15 degrees.

In the touch electrode structure provided by the embodiment of the present disclosure, by arranging the first openings in each first touch electrode block, the touch electrode structure can prevent users from seeing regular thin lines (etched lines) on one hand, thereby improving optical performance, and on the other hand, it can also reduce the load of the touch electrode, thereby improving touch performance. In addition, the first opening is not a linear or strip-shaped opening extending along the second direction, and two ends of the first body portion of the first opening are provided with first extending portions extending along the first direction. In a case the touch electrode structure is bent by taking a bending axis parallel to the second direction as an axis, the first extending portion can effectively prevent the generation of micro cracks, and avoid the problems of bridge structure breakage caused by micro cracks, so that the bending reliability of the touch electrode structure can be improved.

In some examples, the touch electrode structure 100 can be bent about a bending axis parallel to the second direction. Therefore, the touch electrode structure can be applied to a foldable display device, and defects such as micro cracks can not be generated upon being bended, so that the touch electrode structure has good bending reliability.

For example, as illustrated in FIG. 2A, the shape of the first touch electrode block 112 may be a rhombus, and the included angle between the extending direction of the edge of the rhombus and the first direction ranges from 20 to 70 degrees. In addition, the second touch electrode 120 may also include a plurality of second touch electrode blocks 122, and the shape of the second touch electrode blocks 122 may be a rhombus, and the included angle between the extending direction of the rhombus and the first direction may be 20-70 degrees.

In some examples, as illustrated in FIG. 2A, FIG. 2B and FIG. 2C, the second direction is approximately perpendicular to the first direction. In this case, the first extending portions extending along the first direction can better avoid the generation of micro cracks. It should be noted that the above-mentioned "approximately perpendicular" includes strictly perpendicular cases, and also includes cases where the included angle between the first direction and the second direction is within the range of 85-95 degrees.

For example, in a case the touch electrode structure is applied to a display device, the first direction may be a row direction of a pixel unit array in the display device, the second direction may be a column direction of the pixel unit array in the display device, or the first direction may be the column direction of the pixel unit array in the display device, and the second direction may be the row direction of the pixel unit array in the display device.

In some examples, as illustrated in FIG. 2B and FIG. 2C, because the first body portion 132 extends along the second direction and the first extending portion 134 extends along the first direction, the shape of an orthographic projection of the first opening 130 on the plane where the plurality of first touch electrodes 110 are located includes an I-shape.

In some examples, as illustrated in FIG. 2B and FIG. 2C, an edge of each first touch electrode block 112 is a smooth edge, so that cracks can be avoided.

In some examples, as illustrated in FIG. 2B and FIG. 2C, the first body portion 132 has a bending direction, that is to say, the first body portion 132 is bent; the bending directions of the first body portion 132 of the two adjacent first openings 130 in the second direction are opposite, so that the stress caused by bending can be effectively dispersed or released.

In some examples, as illustrated in FIG. 2B and FIG. 2C, two first openings 130 adjacent to each other in the second direction are arranged in a staggered manner in the first direction, which can avoid the formation of cracks between two first openings adjacent to each other in the second direction due to bending, and can effectively disperse or release the stress caused by bending. In some examples, as illustrated in FIG. 2B and FIG. 2C, each first touch electrode block 112 includes a bridge portion 1124, and the bridge structure 114 is connected with two bridge portions 1124 of two first touch electrode blocks 112 adjacent to each other in the second direction. The included angle between the tangent of each point on the outer edge of the bridge portion 1124 (i.e., the edge away from the center of the first touch electrode block) and the second direction is greater than 45 degrees. With this arrangement, in the touch electrode structure, because the included angle between the tangent of each point on the outer edge of the bridge portion and the second direction is greater than 60 degrees, the included angle between any portion of the outer edge of the bridge portion and the second direction is greater than 60 degrees, thus preventing the outer edge of the bridge portion from generating micro cracks and further improving the bending reliability of the touch electrode structure. That is to say, the touch electrode structure modifies the outer edge of the bridge portion from "right-angle design" to "rounded corner design", so that micro cracks can be avoided at the outer edge of the bridge portion.

In some examples, as illustrated in FIG. 2B and FIG. 2C, the included angle between the tangent of each point on the outer edge of the bridge portion 1124 and the second direction is greater than 75 degrees. Therefore, the included angle between any portion of the outer edge of the bridge portion and the second direction is larger than 75 degrees, so that micro cracks on the outer edge of the bridge portion can be better avoided, and the bending reliability of the touch electrode structure can be improved.

In some examples, as illustrated in FIG. 2B and FIG. 2C, the included angle between the tangent of each point on the outer edge of the bridge portion 1124 and the second direction changes continuously, that is to say, the outer edge includes no sharp protrusion, so that the micro crack of the outer edge of the bridge portion can be better avoided.

For example, as illustrated in FIG. 2B, the bridge structure 114 may include a conductive structure 1140, so as to respectively connect the two bridge portions 1124 of two first touch electrode blocks 112 adjacent in the second direction. For example, the bridge structure 114 may include two conductive structures 1140, which respectively connect two bridge portions 1124 of two first touch electrode blocks 112 adjacent in the second direction. Therefore, in a case one of the two conductive structures 1140 is damaged, the other one can still keep the electrical connection between two first touch electrode blocks adjacent in the second direction, thereby improving the stability of the bridge structure.

For example, as illustrated in FIG. 2B, the conductive structure 1140 can have a curved structure, so that the conductive structure 1140 can bear a certain tensile force without breaking, thus being suitable for bendable flexible products.

For example, as illustrated in FIG. 2B, the conductive structure 1140 includes a first curved portion 1140A and a second curved portion 1140B, and the bending directions of the first curved portion 1140A and the second curved portion 1140B are different.

For example, the conductive structure 1140 can be made of metal with high conductivity, such as silver or copper. In addition, the width range of the conductive structure 1140 may be less than 4 µm. In this case, the existence of the conductive structure is usually imperceptible to human eyes, so that the display effect of the touch display device adopting the touch electrode structure provided by the present embodiment can be improved. Of course, embodiments of the present disclosure include but are not limited thereto, and the conductive structure can also be made of transparent conductive oxide materials, such as Indium Tin Oxide (ITO); in a case the conductive structure is made of transparent conductive oxide material, its width can be greater than 4 µm.

Figure 3:
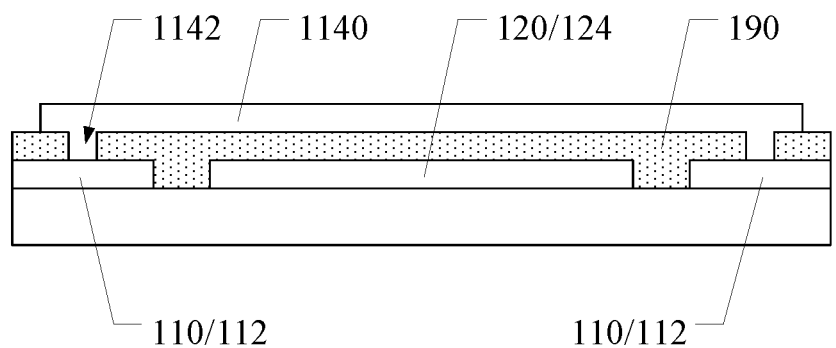
FIG. 3 is a schematic cross-sectional view of a touch electrode structure along a AA direction in FIG. 2C according to an embodiment of the present disclosure.

FIG. 3 is a schematic cross-sectional view of a touch electrode structure along AA direction in FIG. 2C according to an embodiment of the present disclosure. FIG. 3 shows a cross-sectional view of the bridge structure of the touch electrode structure; as illustrated in FIG. 3, the touch electrode structure 100 further includes an insulating layer 190 on the first touch electrode block 112 and the second touch electrode 120. The above-mentioned bridge structure 114 includes a conductive structure 1140 and a via hole 1142 located in the insulating layer 190. The conductive structure 1140 is located on a side of the insulating layer 190 away from the plurality of first touch electrode blocks 112, and is connected with two bridge portions 1124 of two first touch electrode blocks 112 adjacent in the second direction through the via hole 1142 (for example, the conductive structure 1140 passes through the via hole 1142), so as to realize the connection of two adjacent first touch electrode blocks.

It should be noted that, as illustrated in FIG. 3, because the first touch electrode 110 adopts the above-mentioned bridge structure 114, the plurality of first touch electrode blocks 112 and the plurality of second touch electrodes 120 can be arranged in the same layer, that is to say, formed by the same patterning process by using the same material layer. Therefore, the touch electrode structure not only has thinner thickness, better touch performance, but also has lower manufacturing cost.

In some examples, as illustrated in FIG. 2B and FIG. 2C, each second touch electrode 120 includes a plurality of second touch electrode blocks 122 and connection portions 124, the plurality of second touch electrode blocks 122 are arranged in the first direction, the connection portions 124 are located between two adjacent second touch electrode blocks 122, and the second touch electrode blocks 122 are integrally formed with the connection portions 124. The connection portion 124 may be located between two first touch electrode blocks 112 adjacent in the second direction and insulated from the conductive structure 1140 of the bridge structure 114.

In some examples, as illustrated in FIG. 2B and FIG. 2C, in addition to the above-mentioned first openings 130, each first touch electrode block 112 further includes a plurality of second openings 140, and each second opening 140 extends approximately along the first direction. Therefore, the second opening 140 provided in each first touch electrode block 112 can also improve optical performance and touch performance. In addition, because the second opening 140 extends along the first direction, in a case the touch electrode structure is bent by taking the bending axis parallel to the second direction as an axis, the second opening is not easy to form micro cracks.

In some examples, as illustrated in FIG. 2B and FIG. 2C, the second opening 140 has a bending direction, that is to say, the second opening 140 is bent; the bending directions of two adjacent second openings 140 in the first direction are opposite, so that the stress caused by bending can be effectively dispersed or released.

In some examples, as illustrated in FIG. 2B and FIG. 2C, the second openings 140 are arranged in the second direction to form a plurality of second opening rows, and two first openings 130 arranged in sequence in the second direction are arranged between two adjacent second opening rows in the second direction.

In some examples, as illustrated in FIG. 2B and FIG. 2C, an orthographic projection of each first opening 130 on the second opening row is at least partially located between two adjacent second openings 140, so that the stress caused by bending can be effectively dispersed or released.

In some examples, as illustrated in FIG. 2B and FIG. 2C, the included angle between the connection line connecting the end of the first opening 130 close to the second opening 140 and the end of the second opening 140 close to the first opening 130 and the first direction is not equal to 90 degrees, so that the accumulation of stress caused by bending can be avoided, and the stress caused by bending can be effectively dispersed or released.

In some examples, as illustrated in FIG. 2B and FIG. 2C, the first touch electrode block 112 and the second touch electrode block 122 are arranged in the same layer and insulated. Each second touch electrode block 122 includes a plurality of third openings 150, and each third opening 150 includes a second body portion 152 and second extending portions 154 located at two ends of the second body portion 152. The second body portion 154 extends along the second direction and the second extending portions 154 extend along the first direction. In this way, by arranging the third openings in each second touch electrode block, the touch electrode structure can prevent users from seeing regular thin lines (etched lines) on one hand, thereby improving optical performance, and on the other hand, it can also reduce the load of the touch electrode, thereby improving touch performance. Similar to the above-mentioned first opening, the third opening is not a linear or strip-shaped opening extending along the second direction, and the two ends of the second body portion of the third opening are provided with second extending portions extending along the first direction. In a case the touch electrode structure is bent by taking a bending axis parallel to the second direction as an axis, the second extending portion can effectively prevent the generation of micro cracks, and avoid the problems of bridge structure breakage caused by micro cracks, so that the bending reliability of the touch electrode structure can be improved.

In some examples, as illustrated in FIG. 2B and FIG. 2C, each second touch electrode block 122 further includes a plurality of fourth openings 160, and each fourth opening 160 extends approximately along the first direction. Similar to the second openings, the fourth openings 160 provided in each second touch electrode block 122 can also improve optical performance and touch performance. In addition, because the fourth opening 160 extends along the first direction, in a case the touch electrode structure is bent by taking the bending axis parallel to the second direction as an axis, the fourth opening is not easy to form micro cracks.

In some examples, as illustrated in FIG. 2B and FIG. 2C, the edge of each second touch electrode block 122 is a smooth edge, so that the second touch electrode block can also be prevented from cracking due to stress.

Figure 4:
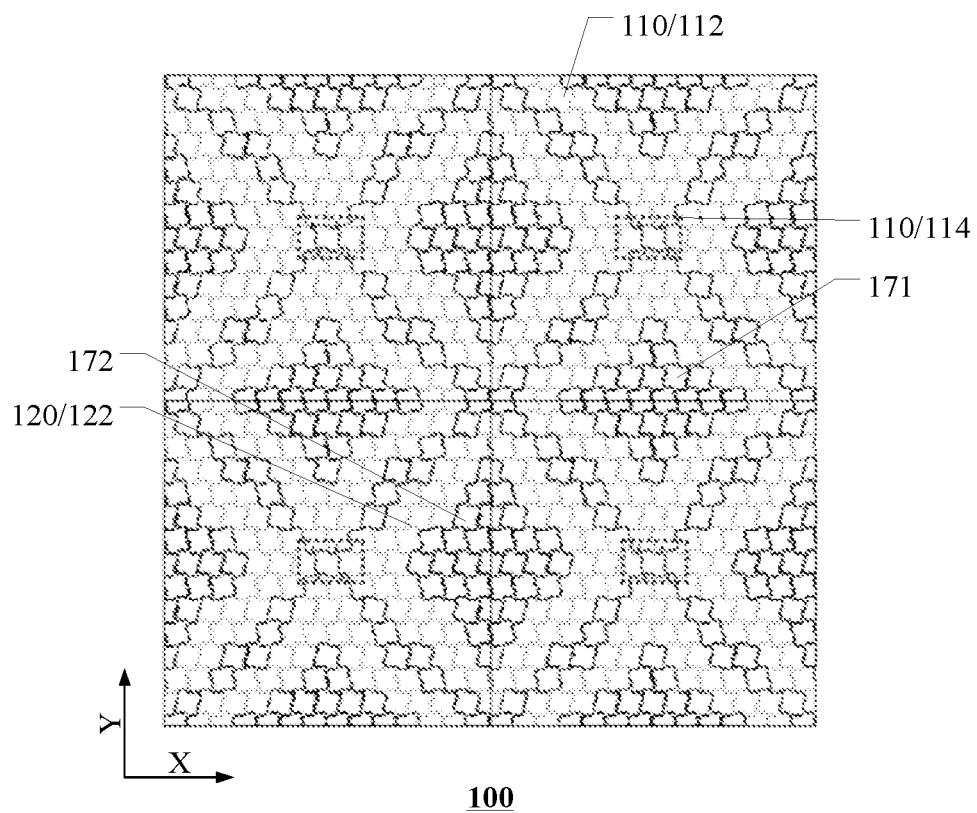
FIG. 4 is another partial plan view of a touch electrode structure according to an embodiment of the present disclosure.

FIG. 4 is another partial plan view of a touch electrode structure according to an embodiment of the present disclosure. As illustrated in FIG. 4, the touch electrode structure 100 further includes a first dummy electrode 171, which is in the same layer as the first touch electrode block 112 and is insulated from the first touch electrode block 112. For example, the first dummy electrode 171 and the first touch electrode block 112 can be formed by the same patterning process by using the same material layer. As illustrated in FIG. 4, the first dummy electrode 171 is located in the middle of the first touch electrode block 112, and the first touch electrode block 112 is disposed around the corresponding first dummy electrode 171. Therefore, the first dummy electrode 171 can reduce the load of the first touch electrode 110. On the other hand, the first dummy electrode can also make the light transmittance of the whole touch electrode structure more uniform, and improve the display effect of the touch display panel adopting the touch electrode structure provided in the present embodiment. For example, as illustrated in FIG. 4, the planar shape of each first touch electrode block 112 may be approximately rhombic, and the planar shape of the first dummy electrode 171 may also be approximately rhombic.

In some examples, as illustrated in FIG. 4, the touch electrode structure 100 further includes a second dummy electrode 172, which is in the same layer as the second touch electrode block 122 and is insulated from the second touch electrode block 122. For example, the second dummy electrode 172 and the second touch electrode block 122 can be formed by the same patterning process by using the same material layer. As illustrated in FIG. 4, the second dummy electrode 172 is located in the middle of the second touch electrode block 122, and the second touch electrode block 122 is disposed around the corresponding second dummy electrode 172. Therefore, the second dummy electrode 172 can reduce the load of the second touch electrode 120.

In some examples, the materials of the first touch electrode 110 and the second touch electrode 120 include transparent oxides, such as Indium Tin Oxide (ITO), Indium Zinc Oxide (IZO), and the like. Of course, the embodiments of the present disclosure include but are not limited thereto, and the above-mentioned first touch electrode and second touch electrode can also be made of other suitable materials, such as silver and its alloy, nano silver, graphene, organic conductive polymers, carbon nanotubes and other conductive materials.

Figure 5:
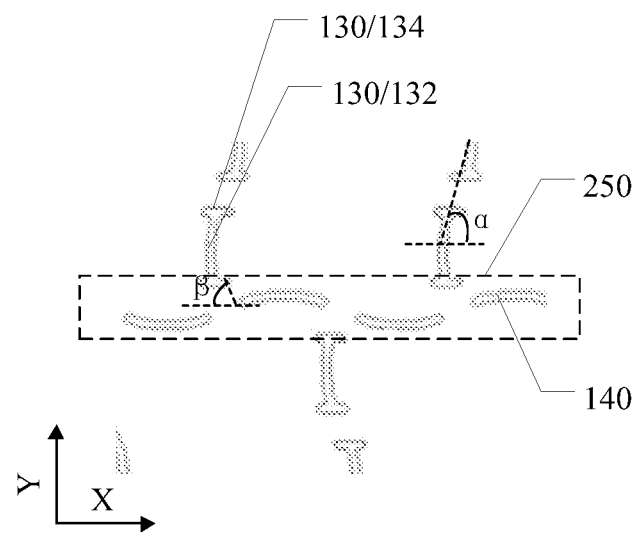
FIG. 5 is a schematic diagram of an opening in a first touch electrode block in a touch electrode structure according to an embodiment of the present disclosure.

FIG. 5 is a schematic diagram of an opening in a first touch electrode block in a touch electrode structure according to an embodiment of the present disclosure. As illustrated in FIG. 5, each first touch electrode block 112 includes a plurality of first openings 130 and second openings 140. Each first opening 130 includes a first body portion 132 and first extending portions 134 located at two ends of the first body portion 132. The first body portion 132 extends along the second direction and the first extending portions 134 extend along the first direction. Each second opening 140 extends approximately along the first direction.

For example, as illustrated in FIG. 5, the first body portion 132 has a bending direction, that is to say, the first body portion 132 is bent; the bending directions of the first body portions 132 of the two first openings 130 adjacent in the second direction are opposite, so that the stress caused by bending can be effectively dispersed or released.

For example, as illustrated in FIG. 5, two first openings 130 adjacent to each other in the second direction are arranged in a staggered manner in the first direction, so that cracks between two first openings adjacent to each other in the second direction due to bending can be avoided, and stress caused by bending can be effectively dispersed or released.

For example, as illustrated in FIG. 5, the included angle α between the central connection line of two adjacent first openings 130 in the second direction and the straight line extending along the first direction is not equal to 90 degrees.

For example, as illustrated in FIG. 5, the included angle α between the central connection line of two adjacent first openings 130 in the second direction and the straight line extending along the first direction is less than 90 degrees, for example, less than 80 degrees. Therefore, the formation of cracks between two adjacent first openings in the second direction caused by bending can be better avoided, and the stress caused by bending can be effectively dispersed or released.

For example, as illustrated in FIG. 5, the second opening 140 has a bending direction, that is to say, the second opening 140 is bent; the bending directions of two adjacent second openings 140 in the first direction are opposite, so that the stress caused by bending can be effectively dispersed or released.

For example, as illustrated in FIG. 5, the second openings 140 are arranged in the second direction to form a plurality of second opening rows 250, and two first openings 130 arranged in sequence in the second direction are arranged between two adjacent second opening rows 250 in the second direction. In this case, the distance between two adjacent second opening rows 250 may be set with two first openings sequentially arranged in the second direction.

For example, as illustrated in FIG. 5, the orthographic projection of each first opening 130 on the second opening row is at least partially located between two adjacent second openings 140, so that the stress caused by bending can be effectively dispersed or released.

For example, as illustrated in FIG. 5, the orthographic projection of each first opening 130 on the second opening row may overlap the end portion of the second opening 140.

For example, as illustrated in FIG. 5, the included angle β between the connection line connecting the end of the first opening 130 close to the second opening 140 and the end of the second opening 140 close to the first opening 130 and the first direction is not equal to 90 degrees, so that the accumulation of stress caused by bending can be avoided, and the stress caused by bending can be effectively dispersed or released. For example, as illustrated in FIG. 5, the included angle β between the connection line connecting the end of the first opening 130 close to the second opening 140 and the end of the second opening 140 close to the first opening 130 and the first direction is less than 90 degrees, such as 80 degrees, so that stress accumulation caused by bending can be better avoided.

It should be noted that, as mentioned above, each second touch electrode block may include a plurality of third openings and a plurality of fourth openings; the shape and arrangement of the third opening can refer to the shape and arrangement of the first opening, the shape and arrangement of the fourth opening can refer to the shape and arrangement of the second opening, and the positional relationship between the third opening and the fourth opening can also refer to the positional relationship between the first opening and the second opening, so the embodiments of the present disclosure will not be described in detail here.

Figure 6:
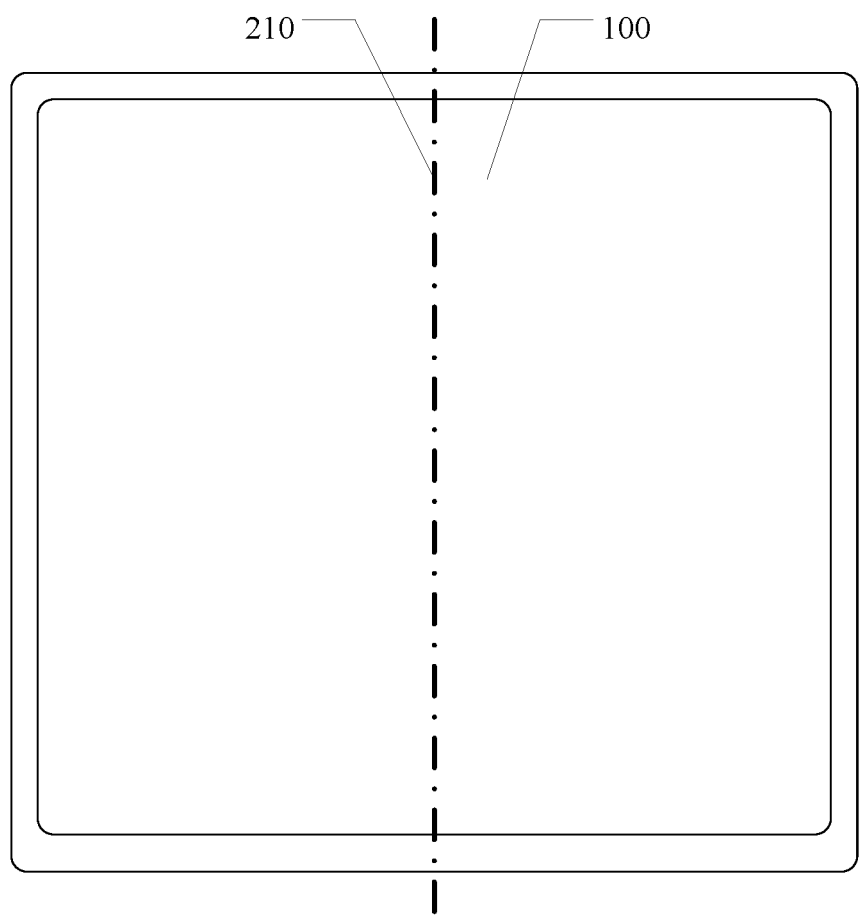
FIG. 6 is a schematic plan view of a display device according to an embodiment of the present disclosure.

An embodiment of the present disclosure also provides a display device. FIG. 6 is a schematic plan view of a display device according to an embodiment of the present disclosure. As illustrated in FIG. 6, the display device 200 includes the touch electrode structure 100. Therefore, the display device has the beneficial effects corresponding to the beneficial effects of the touch electrode structure. For example, the display device has good optical performance and touch performance, and in this case, it has good bending reliability.

In some examples, as illustrated in FIG. 6, the display device 200 includes a bending axis 210, and the extending direction of the bending axis 210 is parallel to the second direction. It should be noted that the above-mentioned bending axis 210 can be a concrete mechanical axis or a virtual axis for bending the display device, and the disclosed embodiment is not limited here.

Figure 7:
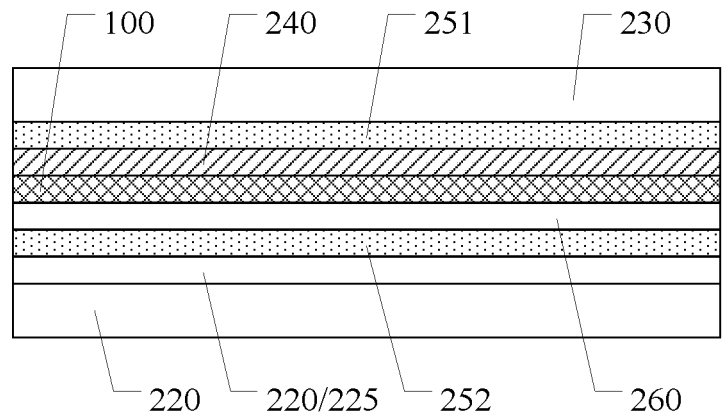
FIG. 7 is a schematic cross-sectional view of a display device according to an embodiment of the present disclosure.
Figure 8:
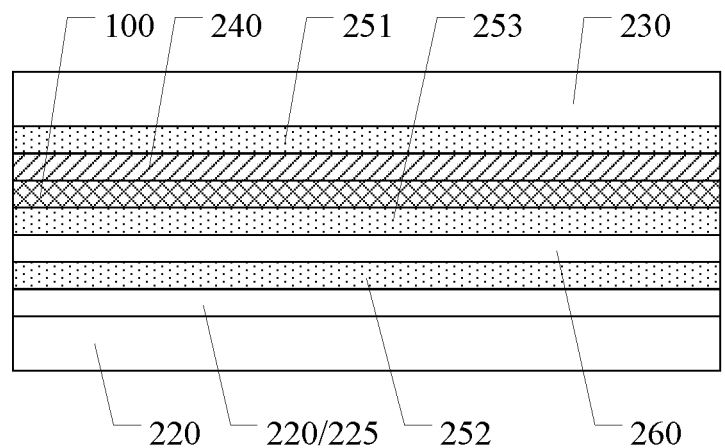
FIG. 8 is a schematic cross-sectional view of another display device according to an embodiment of the present disclosure.
Figure 9:
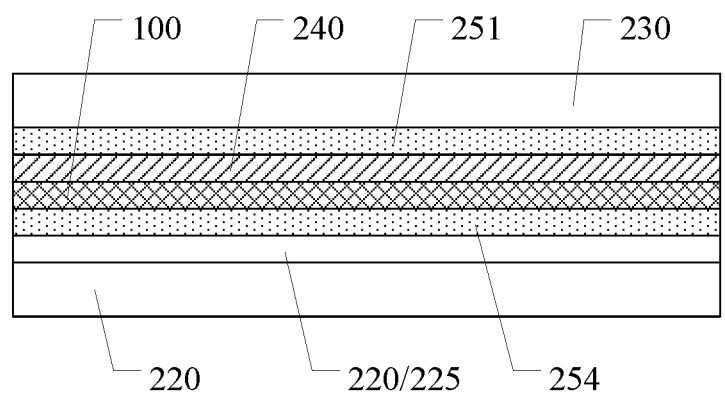
FIG. 9 is a schematic cross-sectional view of another display device according to an embodiment of the present disclosure.
Figure 10:
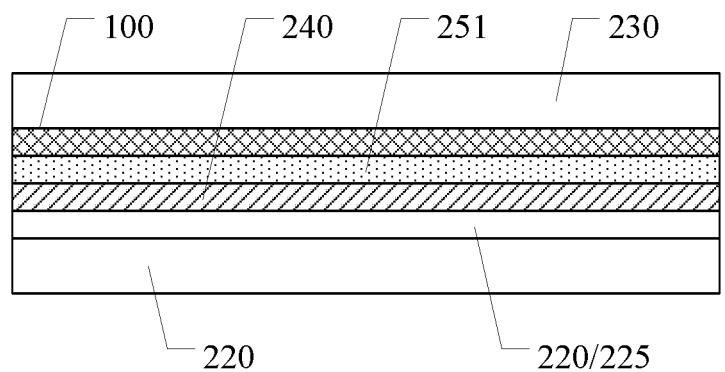
FIG. 10 is a schematic cross-sectional view of another display device provided by an embodiment of the present disclosure.
Figure 11:
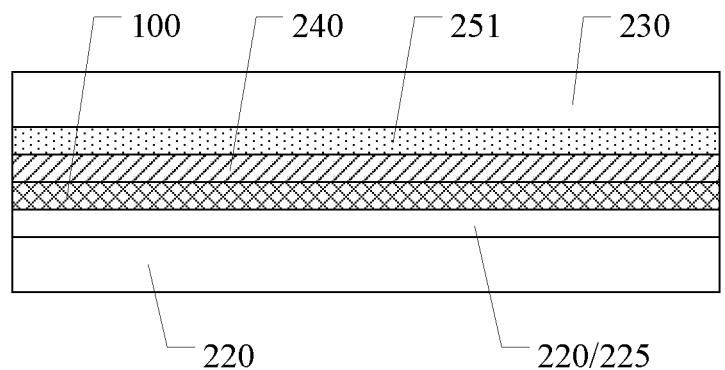
FIG. 11 is a schematic cross-sectional view of another display device according to an embodiment of the present disclosure.

FIG. 7 is a schematic cross-sectional view of a display device according to an embodiment of the present disclosure; FIG. 8 is a schematic cross-sectional view of another display device according to an embodiment of the present disclosure; FIG. 9 is a schematic cross-sectional view of another display device according to an embodiment of the present disclosure; FIG. 10 is a schematic cross-sectional view of another display device provided by an embodiment of the present disclosure; FIG. 11 is a schematic cross-sectional view of another display device according to an embodiment of the present disclosure.

In some examples, as illustrated in FIG. 7-FIG. 11, the display device 200 further includes a display panel 220, a cover plate 230, a polarizer 240 and a first adhesive layer 251. The display panel 220 can display, the cover plate 230 can protect the display device, and the polarizer 240 can play an anti-reflective role.

For example, the thickness of the polarizer 240 may range from 5 to 150 microns; of course, the embodiments of the present disclosure include but are not limited thereto, and the thickness of the polarizer may be other values.

In some examples, as illustrated in FIG. 7, the display device 200 further includes a transparent substrate 260 and a second adhesive layer 252; the second adhesive layer 252 is located between the transparent substrate 260 and the display panel 220. The touch electrode structure 100 is located on the transparent substrate 260, and the transparent substrate 260 is located on a side of the touch electrode structure 100 away from the polarizer 240. That is to say, the touch electrode structure 100 can be first formed on the transparent substrate 260, and then bonded to the display panel 220 through the second adhesive layer 252.

For example, the transparent substrate 260 can be a plastic substrate, such as cycloolefin polymer (COP), polyethylene terephthalate (PET), colorless polyimide (CPI), or polycarbonate (PC).

For example, the thickness of the transparent substrate 260 may range from 10 to 50 microns; of course, the embodiments of the present disclosure include but are not limited thereto, and the thickness of the transparent substrate can also be other values.

In some examples, as illustrated in FIG. 8, the display device 200 further includes a third adhesive layer 253 between the transparent substrate 260 and the touch electrode structure 100. That is to say, the touch electrode structure 100 is bonded to the transparent substrate 260 through the third adhesive layer 253.

In some examples, as illustrated in FIG. 9, the display device 200 further includes a fourth adhesive layer 254 located between the touch electrode structure 100 and the display panel 220; the touch electrode structure 100 is located on the polarizer 240, and the touch electrode structure 100 is located on a side of the polarizer 240 away from the first adhesive layer 251. That is to say, the touch structure 100 can be first formed on the polarizer 240, and then bonded to the display panel 220 through the fourth adhesive layer 254.

In some examples, as illustrated in FIG. 10, the touch electrode structure 100 is located between the cover plate 230 and the first adhesive layer 251. That is to say, the touch electrode structure 100 can be first formed on the cover plate 230, and then bonded to the polarizer through the first adhesive layer 251.

For example, the cover plate 230 may be a flexible cover plate, and the material of the flexible cover plate may be cycloolefin polymer (COP), polyethylene terephthalate (PET), colorless polyimide (CPI), or polycarbonate (PC).

For example, the thickness of the cover plate 230 may range from 30 to 250 microns. Of course, the embodiments of the present disclosure include but are not limited thereto, and the thickness of the cover plate may be other values.

In some examples, as illustrated in FIG. 11, the display panel 220 includes an encapsulation layer 225, and the touch electrode structure 100 is located between the encapsulation layer 225 and the polarizer 240. That is to say, the touch electrode structure 100 can be directly formed on the encapsulation layer 225 of the display panel 220.

In some examples, the first adhesive layer, the second adhesive layer and the third adhesive layer may be transparent optical adhesive (OCA) or pressure sensitive adhesive (PSA). Of course, the embodiments of the present disclosure include but are not limited thereto, and the above-mentioned first adhesive layer, second adhesive layer and third adhesive layer can also adopt other suitable adhesive materials.

For example, the thickness of the first adhesive layer, the second adhesive layer and the third adhesive layer can be in the range of 5-100 microns; of course, the embodiments of the present disclosure include but are not limited thereto, and the thicknesses of the first adhesive layer, the second adhesive layer and the third adhesive layer can also be other values.

In some examples, the above-mentioned display panel can adopt an organic light emitting diode (OLED) display panel, so it has the advantages of being bendable, self-luminous, low power consumption, etc. Of course, the embodiments of the present disclosure include but are not limited thereto, and the display panel can also be other display panels such as a liquid crystal display panel, a light emitting diode (LED) display panel, a plasma display panel, etc.

In some examples, the above device may be a portable electronic device such as a smart phone or a tablet computer. Of course, the embodiments of the present disclosure include, but are not limited thereto, and the above-mentioned display device can also be an electronic device with display function such as an electronic photo frame, a notebook computer, a television and the like.

The following points required to be explained:

(1) The drawings of the embodiments of the present disclosure only relate to the structures related to the embodiments of the present disclosure, and other structures can refer to the general design.

(2) Without conflict, the embodiments of the present disclosure and the features in the embodiments may be combined with each other to obtain new embodiments.

The above are only the specific embodiments of this disclosure, but the scope of protection of this disclosure is not limited thereto. Any person familiar with this technical field can easily think of changes or substitutions within the technical scope disclosed in this disclosure, which should be covered by the scope of protection of this disclosure. Therefore, the scope of protection of this disclosure should be based on the scope of protection of the claims.

What is claimed is:

1. A display device, comprising:
    a touch electrode structure
    a display panel;
    a cover plate;
    a polarizer; and
    a first adhesive layer, located between the cover plate and the polarizer,
    wherein the touch electrode structure is located between the display panel and the cover plate, the touch electrode structure comprises: a plurality of first touch electrodes, arranged along a first direction, and each of the plurality of first touch electrodes extending along a second direction; and a plurality of second touch electrodes, arranged along the second direction, each of the plurality of second touch electrodes extending along the first direction, each of the first touch electrodes comprises a plurality of first touch electrode blocks and a bridge structure, the plurality of first touch electrode blocks are arranged along the second direction, and the bridge structure is located between two adjacent ones of the plurality of first touch electrode blocks,
    each of the plurality of first touch electrode blocks comprises a plurality of first openings, each of the plurality of first openings comprises a first body portion and first extending portions located at two ends of the first body portion, the first body portion extends approximately along the second direction and the first extending portions extends approximately along the first direction,
    the display device further comprises:
        a transparent substrate;
        a second adhesive layer, located between the transparent substrate and the display panel; and
        a third adhesive layer, located between the transparent substrate and the touch electrode structure,
        wherein the touch electrode structure is bonded to the transparent substrate through the third adhesive layer, and the transparent substrate is located on a side of the touch electrode structure away from the polarizer and bonded to the display panel through the second adhesive layer,
    each of the plurality of first touch electrode blocks comprises a bridge portion, and the bridge structure is connected with two bridge portions of two adjacent ones of the plurality of first touch electrode blocks in the second direction, respectively,
    an included angle between a tangent of each point on an outer edge of the bridge portion and the second direction is greater than 60 degrees.

2. The display device according to claim 1, further comprising:
    a fourth adhesive layer, located between the touch electrode structure and the display panel,
    wherein the touch electrode structure is located on the polarizer, and the touch electrode structure is located on a side of the polarizer away from the fourth adhesive layer.

3. The display device according to claim 2, wherein the touch electrode structure is located between the cover plate and the first adhesive layer.

4. The display device according to claim 2, wherein the display panel comprises an encapsulation layer, and the touch electrode structure is located between the encapsulation layer and the polarizer.

5. The display device according to claim 1, wherein the touch electrode structure is configured to be bent by taking a bending axis parallel to the second direction as an axis.

6. The display device according to claim 1, wherein an edge of each of the plurality of first touch electrode blocks is a smooth edge.

7. The display device according to claim 1, wherein a shape of an orthographic projection of each of the plurality of first openings on a plane where the plurality of first touch electrodes are located comprises an I-shape.

8. The display device according to claim 1, wherein the first body portion comprises a bending direction, and bending directions of first body portions of two adjacent ones of the plurality of first openings in the second direction are opposite.

9. The display device according to claim 1, wherein two adjacent ones of the plurality of first openings in the second direction are staggered in the first direction.

10. The display device according to claim 1, wherein the included angle between the tangent of each point on the outer edge of the bridge portion and the second direction continuously changes.

11. The display device according to claim 1, wherein the touch electrode structure further comprises: an insulating layer, located on the plurality of first touch electrode blocks and the plurality of second touch electrodes, wherein the bridge structure comprises a conductive structure and a via hole located in the insulating layer, the conductive structure is located on a side of the insulating layer away from the plurality of first touch electrode blocks, and the bridge structure is respectively connected with two bridge portions of two adjacent ones of the plurality of first touch electrode blocks in the second direction through the via hole.

12. The display device according to claim 1, wherein each of the plurality of first touch electrode blocks further comprises a plurality of second openings, and each of the plurality of second openings extends approximately along the first direction.

13. The display device according to claim 12, wherein each of the plurality of second openings comprises a bending direction, and bending directions of two adjacent ones of the plurality of second openings in the first direction are opposite.

14. The display device according to claim 12, wherein the plurality of second openings are arranged along the second direction to form a plurality of second opening rows, and two adjacent ones of the plurality of second opening rows in the second direction are provided with two first openings of the plurality of first openings which are arranged in sequence along the second direction.

15. The display device according to claim 14, wherein an orthographic projection of each of the plurality of first openings on one of the plurality of second opening rows is at least partially located between two adjacent ones of the plurality of second openings.

16. The display device according to claim 1, wherein each of the plurality of second touch electrodes comprises a plurality of second touch electrode blocks and a plurality of connection portions, the plurality of second touch electrode blocks are arranged along the first direction, each of the connection portions is located between two adjacent ones of the plurality of second touch electrode blocks, and the plurality of second touch electrode blocks are integrally formed with the plurality of connection portions, an edge of each of the plurality of second touch electrode blocks is a smooth edge.

17. The display device according to claim 1, wherein the plurality of first touch electrode blocks and the plurality of second touch electrode blocks are arranged in a same layer and insulated, and each of the plurality of second touch electrode blocks comprises a plurality of third openings, and each of the plurality of third openings comprises a second body portion and second extending portions located at two ends of the second body portion, the second body portion extends approximately along the second direction and the second extending portions extend approximately along the first direction.

18. The display device according to claim 1, wherein the touch electrode structure further comprises:
    a first dummy electrode, arranged in a same layer as the plurality of first touch electrode blocks and insulated from the plurality of first touch electrode blocks,
    wherein the first dummy electrode is located in a middle of each of the plurality of first touch electrode blocks, and the each of the plurality of first touch electrode blocks are arranged around the first dummy electrode.

\* \* \* \* \*